United States Patent [19]

Ozari et al.

[11] 4,315,085

[45] Feb. 9, 1982

[54] CORE-SHELL COMPOSITE POLYMERS HAVING HIGH AMOUNTS OF CARBOXYLIC ACID UNITS IN THE SHELL

[75] Inventors: Yehuda Ozari, Louisville, Ky.; Eugene S. Barabas, Watchung, N.J.

[73] Assignee: GAF Corporation, New York, N.Y.

[21] Appl. No.: 172,924

[22] Filed: Jul. 25, 1980

[51] Int. Cl.³ .................. C08F 265/06; C08F 263/04
[52] U.S. Cl. .................................... 525/301; 525/902
[58] Field of Search ................................ 525/301, 902

[56] References Cited

U.S. PATENT DOCUMENTS

| | | | |
|---|---|---|---|
| 3,565,833 | 2/1971 | Adriaan et al. | 525/301 |
| 3,622,652 | 11/1971 | Hamed et al. | 525/301 |
| 3,644,584 | 2/1972 | Fryd | 525/301 |
| 3,646,164 | 2/1972 | Deichert et al. | 525/301 |
| 3,652,721 | 3/1972 | Dalton et al. | 525/301 |
| 3,676,528 | 7/1972 | Severini et al. | 525/301 |
| 3,700,754 | 10/1972 | Schmitt et al. | 525/301 |
| 4,002,801 | 1/1977 | Knechtges et al. | 525/301 |
| 4,264,678 | 4/1981 | Nelsen et al. | 525/301 |

*Primary Examiner*—William F. Hamrock
*Attorney, Agent, or Firm*—James Magee, Jr.; Sheldon H. Parker

[57] ABSTRACT

Aqueous dispersions of soft polymers, and particularly butadiene-styrene copolymers, containing high amounts of carboxylic acid units are prepared by a core-shell polymerization technique in which there is first polymerized around the soft polymer an inner shell layer of methylmethacrylate, thereby completely encasing the soft polymer particles. Then an outer layer of methylmethacrylate and methacrylic acid monomers is polymerized around the encased particles. The product contains up to about 40 mole percent of methacrylic acid units in the shell.

12 Claims, 3 Drawing Figures

CORE-SHELL COMPOSITE POLYMERS HAVING HIGH AMOUNTS OF CARBOXYLIC ACID UNITS IN THE SHELL

BACKGROUND OF THE INVENTION

This invention relates to rubbery polymers having an unusually high concentration of reactive carboxylic acid groups on the surface of the polymer particles. More particularly, it relates to core-shell polymer particles having soft polymers, such as polybutadiene or styrene-butadiene copolymer, as the core particles and a shell comprising poly(methylmethacrylate) and a copolymer of methylmethacrylate and methacrylic acid.

Polymers containing "available" carboxylic acid groups for reaction are valuable industrial materials. In particular, soft polymers, particularly rubbery polymers having such carboxyl groups can be utilized in various applications such as, for example, in adhesives, binders, coatings, etc. However, water-based dispersions of these rubbery polymers, such as, styrene-butadiene copolymers, having carboxylic acid concentration higher than about 3 or 4 percent are extremely unstable.

Efforts at obtaining water-based dispersions of styrene-butadiene copolymers with higher carboxylic acid concentration have heretofore met with little success. In pending U.S. Patent application Ser. No. 115,824, filed Jan. 28, 1980, there are disclosed core-shell polymer compositions in which the core comprises soft rubbery polymer particles such as polybutadiene or styrene-butadiene copolymer, and the shell comprises a polymerized alkyl methacrylate, notably poly(methylmethacrylate). Latices of these core-shell copolymers were found to exhibit excellent stability. However, efforts to incorporate significant amounts of carboxylic acid groups on the copolymer shell were not successful. For example, an attempt to graft 10 percent (by weight) of an equimolar mixture of methylmethacrylate and methacrylic acid onto SBR core particles was not successful. The latex coagulated into a rubbery mass which could not be redispersed by mechanical agitation. It was apparent that the SBR core was involved in the coagulation and that, in all likelihood, the monomers diffused into the core before they could have been polymerized.

It is therefore a prime object of this invention to develop a stable aqueous dispersion of a soft polymer, particularly SBR having a high amount of carboxylic acid groups. It is a further object of this invention to develop a relatively simple process for the preparation of such dispersions.

SUMMARY OF THE INVENTION

This invention provides a stable aqueous dispersion of a core-shell composite polymer having a soft polymer core and a two-layered shell having up to about 40 mole percent of methamethacrylic acid units. The core polymer comprises discrete particles of a soft polymer, such as polybutadiene or SBR. To an emulsion of the core polymer particles, there is added methylmethacrylate which, on polymerization, causes the formation of an inner shell layer completely encasing the soft polymer core particles. To an emulsion of the encased polymer particles, there is then added a mixture of methylmethacrylate and methacrylic acid which, on polymerization, forms the outer layer of the shell. The methacrylic acid employed as one of the monomers forming the outer layer can be chosen in an amount sufficient so that up to about 40 mole percent of the shell comprises methacrylic acid units.

DETAILED DISCLOSURE

Figure 1:
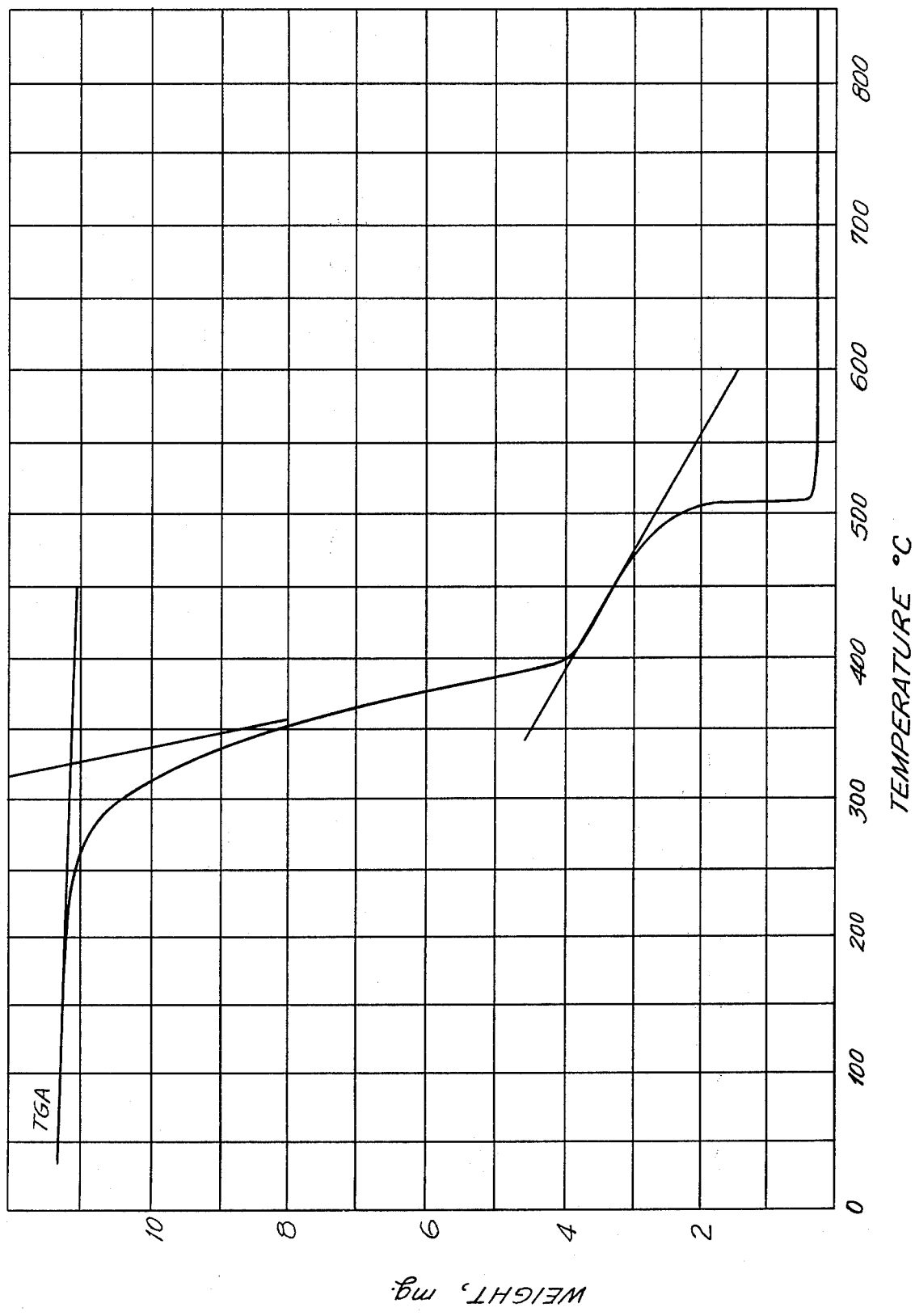
FIGS. 1 and 2 are, respectively thermogravimetric and thermomechanical analyses of a core-shell polymer according to this invention.

In copending application Ser. No. 115,824, filed Jan. 28, 1980, there are disclosed core-shell copolymers and a process for their preparation. The disclosed copolymers include those in which the core material is polybutadiene or a copolymer of butadiene and styrene and in which the shell material is poly(methylmethacrylate). The process there disclosed involves essentially, the addition to an aqueous emulsion of the core polymer particles of an amount of methylmethacrylate sufficient, on polymerization, to form a complete shell around the particles. By the process of instant invention, these enclosed particles are further encapsulated in an outer shell layer comprising a copolymer of methylmethacrylate and methacrylic acid.

The core-shell composite polymer of the instant invention is produced from discrete particles of a soft polymer as the core polymer. By "soft polymer" is meant rubbery polymer such as, for example (1) polybutadiene, (2) a core copolymer of butadiene and styrene (SBR), (3) a terpolymer of butadiene, styrene and from about 2 to 12 weight percent of an alkyl methacrylate in which the alkyl group has from 1 to 18 carbon atoms, or (4) a copolymer of ethylene and vinyl acetate. Preferably, the core material is a copolymer of styrene and butadiene, but the composition of the core is not narrowly critical and other rubbery polymeric substances other than those specifically mentioned can also be used.

The copolymeric substances usable as core materials have preferably been randomly copolymerized and treated so that there is a minimum of unreacted monomer. Although not considered necessary, the polymer core may also contain up to about 10 percent by weight of a polymerized carboxylic acid such as, for example, itaconic, methacrylic or fumaric acid. If present, the acid preferably will be in an amount ranging from about 2 to about 4 percent by weight of the polymer core substance.

If a copolymer containing styrene and butadiene is employed as the core material, it is preferable that the butadiene be present in at least about 45 weight percent, more preferably at least 70 weight percent, of the polymer core. The polymer core may also contain other monomers, in small amounts, which are known to be compatible with butadiene for incorporation into polyvinyl chloride compositions.

If the polymer core is a terpolymer of butadiene, styrene, and an alkyl methacrylate, it is preferable that the alkyl methacrylate be present in an amount ranging from about 4 to about 10% by weight. The preferred alkyl methacrylate is methylmethacrylate. Further information about these termonomer compositions may be found in copending application, Ser. No. 59,673 filed July 23, 1979, pertinent portions of which are incorporated herein by reference.

The core polymer is placed in an aqueous emulsion and there is added to the emulsion, as a monomer to form the inner layer of the shell, methylmethacrylate in an amount sufficient, on polymerization to substantially encapsulate the core polymer. There may optionally be included with the methylmethacrylate a small amount up to about 1 percent by weight of a cross-linking abut such as allyl methacrylate. On polymerization, the polymer core particles are substantially completely encased by an integral shell layer of the polymerized methylmethacrylate, but the centers of the composite polymer are free of any methylmethacrylate.

Further details concerning the preparation of core polymer particles encapsulated by the first shell layer may be found in Ser. No. 115,824, filed Jan. 28, 1980, pertinent portions of which are incorporated herein by reference.

The polymer particles encapsulated by the inner layer of the shell are then subjected to a second emulsion polymerization reaction. The second polymerization is performed under conditions substantially similar to those of the first polymerization, except that the monomers comprise a mixture of methylmethacrylate and methacrylic acid. The molar ratio of methylmethacrylate to methacrylic acid ranges from about 1:3 to about 3:1. Conveniently, an equimolar mixture of methylmethacrylate and methacrylic acid is used. After the second polymerization, there is formed a core-shell copolymer in which the core is a soft polymer, and the shell comprises two layers: an inner layer of poly(methylmethacrylate) and an outer layer which is a copolymer of methylmethacrylate and methacrylic acid.

The core-shell copolymer can contain up to about 40 mole percent, preferably from 12 to 40 mole percent, of methyacrylic acid units in its shell. The shell itself comprises from about 30 to 75 weight percent, preferably from 40 to 70 weight percent, of the composite polymer. In the shell itself, the inner layer and the outer layer each can comprise from about 35 to about 65 weight percent of the shell.

The core-shell copolymer of this invention is initially obtained in the form of a stable emulsion. Said emulsion will, upon sitting for long periods of time, precipitate out. However, it has been found that the precipitate can be easily reemulsified by mild agitation. Alternatively, the product can be obtained from the emulsion as a dry powder, according to methods well known in the art.

As noted above, one of the conditions for the practice of this invention is that the inner shell layer substantially completely cover the core polymer. It is also preferable, though not essential, that the outer shell layer substantially completely cover the core polymer enclosed by the inner shell layer. The thickness of the shell layer necessarily will vary depending on a number of conditions, including the composition of the core, the diameter of the core and the conditions of each polymerization. If the core is not substantially completely covered by the inner shell polymer, there is the possibility that the methacrylic acid in the second polymerization reaction will penetrate into the core polymer and cause coagulation. No firm figures for the actual amount of shellforming monomers required in any particular case can be given, but these can be easily determined without undue experimentation. For example, it has been found that where SBR core particles of 0.1 to 0.2 micron diameter are covered with an inner shell layer of poly(methylmethacrylate), the point of encapsulation, i.e., where the shell layer completely covers the core—occurs at about 23 percent of shell material.

The shell is usually not of uniform thickness throughout, and this is due to the method in which each layer forms. Typically, in each polymerization reaction the shell material begins polymerizing at a localized point in the surface of the core. The surface area covered continues to grow as polymerization proceeds until the entire surface of the core is covered. In this manner, the first formed areas will be thin. Thus, the polymer composite particles are not likely to be spherical in shape, but this does not generally detract from their usefulness.

The morphological structure of a core-shell polymer of this invention was verified by instrumental thermal analysis. FIG. 1 shows the results of the thermogravimetric analysis of a polymer consisting of a 49/51 poly(styrene-butadiene) core and a two layered shell of poly(methylmethacrylate) and methylmethacrylate/methacrylic acid copolymer (50/50), whose initial weight was 11.25 mg.

Figure 2:
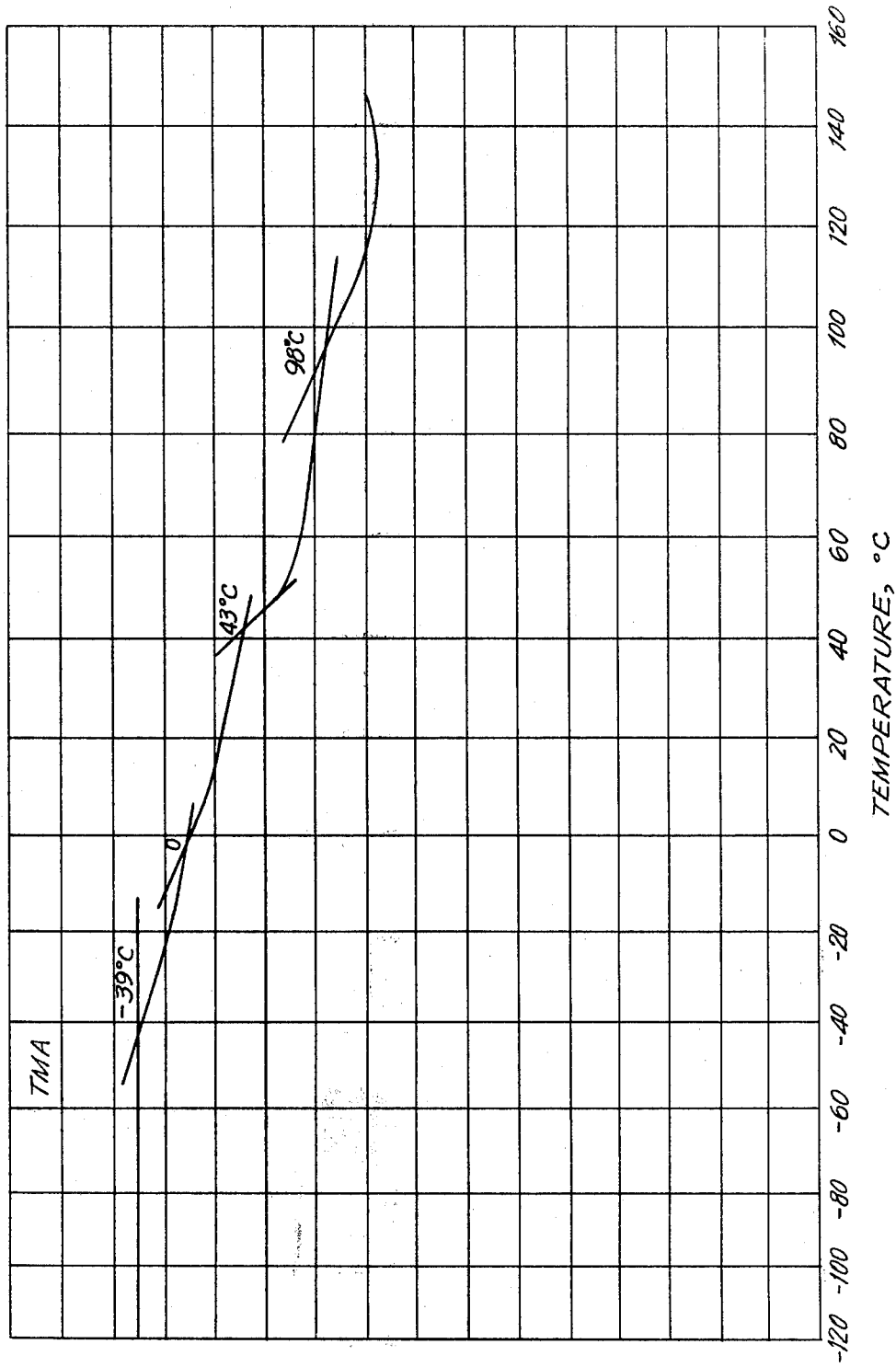

The results of the thermomechanical analysis, as shown in FIG. 2, indicate a quite intricate structure. The first transition at $-30°$ C. belongs to the SBR-core. The following two transitions—one at 0° C. and another one at 43° C.—indicate that the methylmethacrylate actually penetrates the core when swelling later. In this way, two interpenetrated layers are formed: one is rich in butadiene and styrene and the other one is rich in methylmethacrylate. Outside this structure lies the shell consisting of poly(methylmethacrylate) and the copolymer of methylmethacrylate and methacrylic acid. The fact that there is only one transition, shows that poly(methylmethacrylate) and the copolymer of methylmethacrylate and methacrylate acid are intimately mixed in the shell. Further evidence is that the temperature of this fourth transition is 98° C. instead of 105° C. (the Tg of poly(methylmethacrylate).

Figure 3:
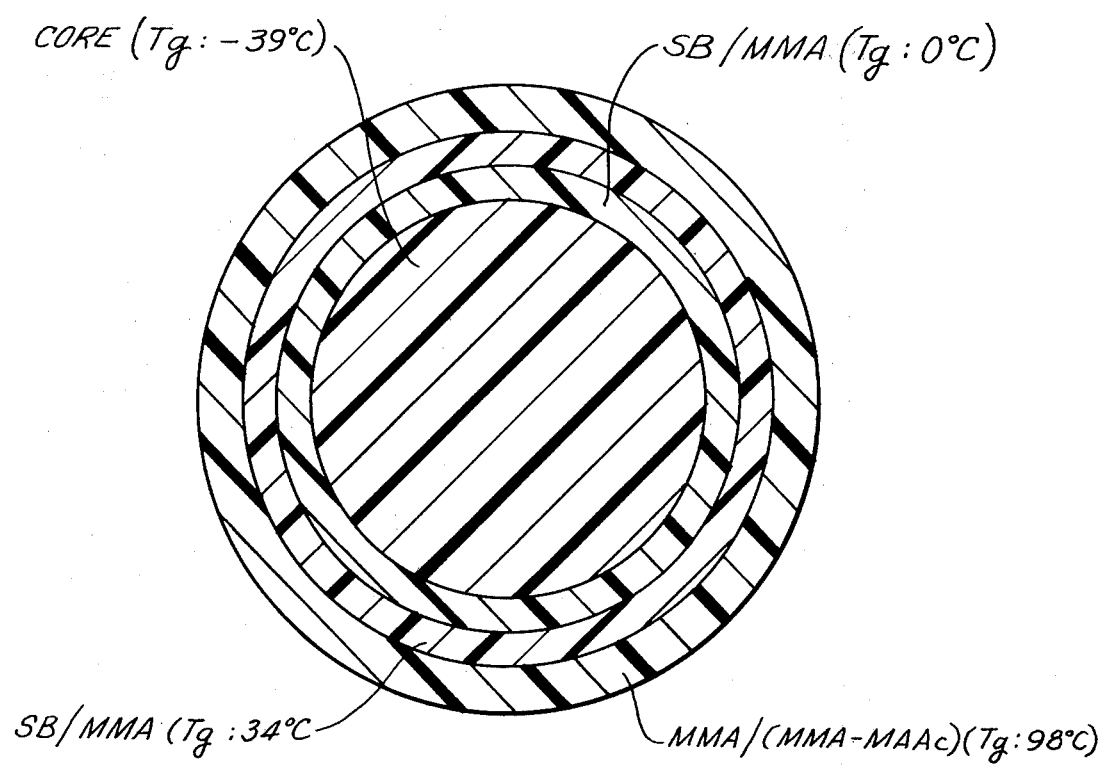
FIG. 3 is a schematic drawing of the structure of said polymer particle. These drawings will be discussed in more detail below.

The structure of the SBR core-shell copolymer, indicated by the TMA curve, is illustrated in FIG. 3.

The following examples are presented for the purpose of illustrating and explaining the present invention, and are not to be taken as limiting in any regard. Unless otherwise indicated, all parts and percentages are given by weight.

EXAMPLE I

In this and subsequent examples, the apparatus used was a 5 liter, 4 necked flask equipped with mechanical stirrer, reflux condenser, dropping funnel and thermometer. The flask was heated by steam, cooled by air and controlled with a thermowatch to maintain constant temperature ($\pm 0.2°$ C.).

The initial charge to the flask was 837 g SBR (51% butadiene, 49% styrene, TSC=48.4%), 2284 g double distilled water, and 5 g Siponate DS-10 (25% in water). The mixture was heated to 80° C. with continuous stirring, then 3 g ammonium persulfate in 25 g water was added. After that 100.8 g methylmethacrylate was added dropwise in 45 minutes. After the addition was completed, the temperature was maintained for 1 hour. Then 3.08 g ammonium persulfate in 25 g water and 5 g Siponate DS-10 in 25 g water were added again and a mixture of 26.9 g methylmethacrylate and 23.1 g methacrylic acid (1.1 molar) was added dropwise over 15 min. and the agitation rate increased. At this point, the emulsion thickened and it was necessary to add 700 g water. (Repetition of this procedure showed that, if the 700 g water is charged at the beginning of the reaction, the emulsion will not thicken at this point.) Additional mixture of 61.8 g methylmethacrylate and 53.2 methacrylic acid (equimolar) was added over 30 min. then the emulsion was air cooled to room temperature while maintaining agitation.

No coagulation occurred. After sitting on a shelf for 10 days, a precipitate formed, which was readily re-emulsified by agitation.

EXAMPLE II–V

Using the procedure of Example I, core-shell polymer were prepared in which the core polymer base, had the following compositions:
II—53% butadiene, 47% styrene
III—70% butadiene, 30% styrene
IV—polybutadiene
V—ethylene—vinyl acetate copolymer
In all of these examples, no coagulation occurred.

We claim:
1. A core-shell composite polymer having a soft polymer core and a two layered shell having up to about 40 mole percent of methacrylic acid units therein, said core-shell composite polymer being produced by a process comprising the steps of:
   (a) providing, as the core polymer, an emulsion comprising discrete particles of a soft polymer of butadiene or copolymer of ethylene and vinyl acetate in an aqueous vehicle,
   (b) adding to the emulsion, as a monomer to form an inner layer of the shell, methylmethacrylate in an amount sufficient to form, upon polymerization, a substantially complete enclosure around the particles of the core polymer,
   (c) reacting the emulsion under conditions effective to polymerize the methylmethacrylate to form discrete soft polymer core particles which are completely encased by an integral enclosure of poly(methylmethacrylate), but are free of methylmethacrylate at least in the center thereof,
   (d) further adding to the emulsion, as monomers to form an outer layer of the shell, a mixture of methylmethacrylate and methacrylic acid in molar ratio of from 1:3 to 3:1, in an amount sufficient to form, upon polymerization, a substantially complete enclosure around the encased particles of the core polymer, and
   (e) reacting the emulsion, under conditions effective to copolymerize the methylmethacrylate and methacrylate acid, thereby forming around the encased polymer particles produced in step (c) an integral outer shell layer of a copolymer of methylmethacrylte and methacrylate acid.

2. A polymer according to claim 1 in which the soft polymer is (1) polybutadiene, (2) a copolymer of butadiene and styrene, (3) a terpolymer of butadiene, styrene and from about 2 to about 12 weight percent of an alkyl methacrylate in which the alkyl has from about 1 to 18 carbon atoms, or (4) a copolymer of ethylene and vinyl acetate.

3. A polymer according to claim 2 in which the core polymer is a copolymer of butadiene and styrene.

4. A polymer according to claim 3 in which the core polymer additionally includes a copolymerized carboxylic acid.

5. A polymer according to claim 4 in which the acid is itaconic, methacrylic or fumaric.

6. A polymer according to claims 3 or 5 in which the core polymer contains at least 45 weight percent of butadiene.

7. A polymer according to claim 6 in which the core polymer contains at least 70 weight percent of butadiene.

8. A polymer according to claim 1 in which the shell comprises about 30 to 75 weight percent of the composite polymer.

9. A polymer according to claim 8 in which the shell comprises from 40 to 70 percent of the composite polymer.

10. A polymer according to claims 8 or 9 in which the inner layer and the outer layer of the shell comprise from about 35 to about 65 percent of the shell.

11. A polymer according to claims 1 or 10 in which the mixture of monomers employed to form the outer layer of the shell is an equimolar mixture of methylmethacrylate and methacrylic acid.

12. A polymer according to claim 1 in which the shell has from 12 to 40 mole percent of methacrylic acid units.

* * * * *